United States Patent [19]
Ochs

[11] 3,982,559
[45] Sept. 28, 1976

[54] HIGH TEMPERATURE FLUID PRESSURE CONTROL VALVE

[76] Inventor: Paul Ochs, 2 Druid Hill Drive, Parsippany, N.J. 07054

[22] Filed: Aug. 10, 1973

[21] Appl. No.: 387,324

Related U.S. Application Data

[63] Continuation of Ser. No. 817,455, April 18, 1969.

[52] U.S. Cl. .............................. 137/455; 137/488; 137/505.18; 251/61.2; 251/331; 251/368; 92/97; 92/103 SD
[51] Int. Cl.² ......................................... F16K 31/12
[58] Field of Search .............. 137/505.18, 454.6, 87; 251/331, 368; 92/5, 97, 103

[56] References Cited
UNITED STATES PATENTS

| | | | |
|---|---|---|---|
| 2,501,957 | 3/1950 | Moore | 92/97 X |
| 2,736,332 | 2/1956 | Simmons | 137/87 |
| 3,095,897 | 7/1963 | Pennstrom | 137/505.18 X |
| 3,130,954 | 4/1964 | McFarland | 251/368 X |

*Primary Examiner*—Harold W. Weakley
*Attorney, Agent, or Firm*—Darby & Darby

[57] ABSTRACT

A fluid pressure operated control apparatus comprising a casing having an inlet and outlet for the flow of fluid under pressure, a diaphragm mounted in the casing having opposite sides thereof responsive respectively to outlet fluid pressure and a regulating pressure and valve means actuated by the diaphragm in response to pressure variations on its opposite sides for regulating outlet fluid pressure. The diaphragm is comprised of a main layer incompatible with high temperature pure steam and a protective layer. The layers are separable to provide for a contaminant fluid therebetween. The valve trim, including the valve head and stem, a valve stem guide and valve guide bushing having a snap-on valve seat, are insertable into and removable from the casing as an assembly, thereby providing for quick change of the valve trim.

15 Claims, 9 Drawing Figures

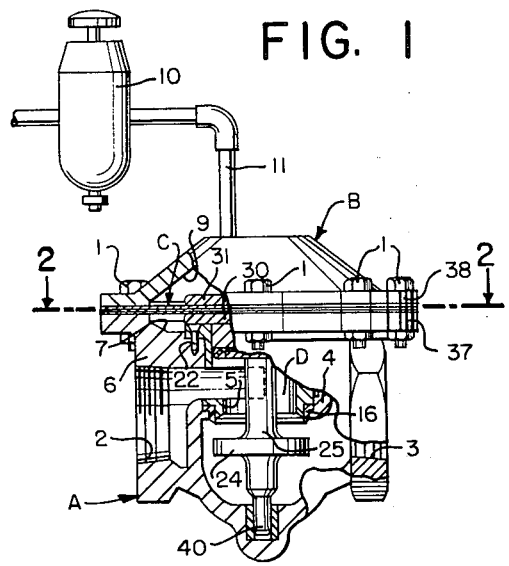
FIG. 1
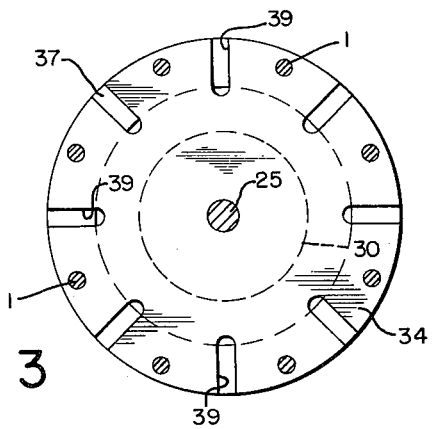
FIG. 2
FIG. 3
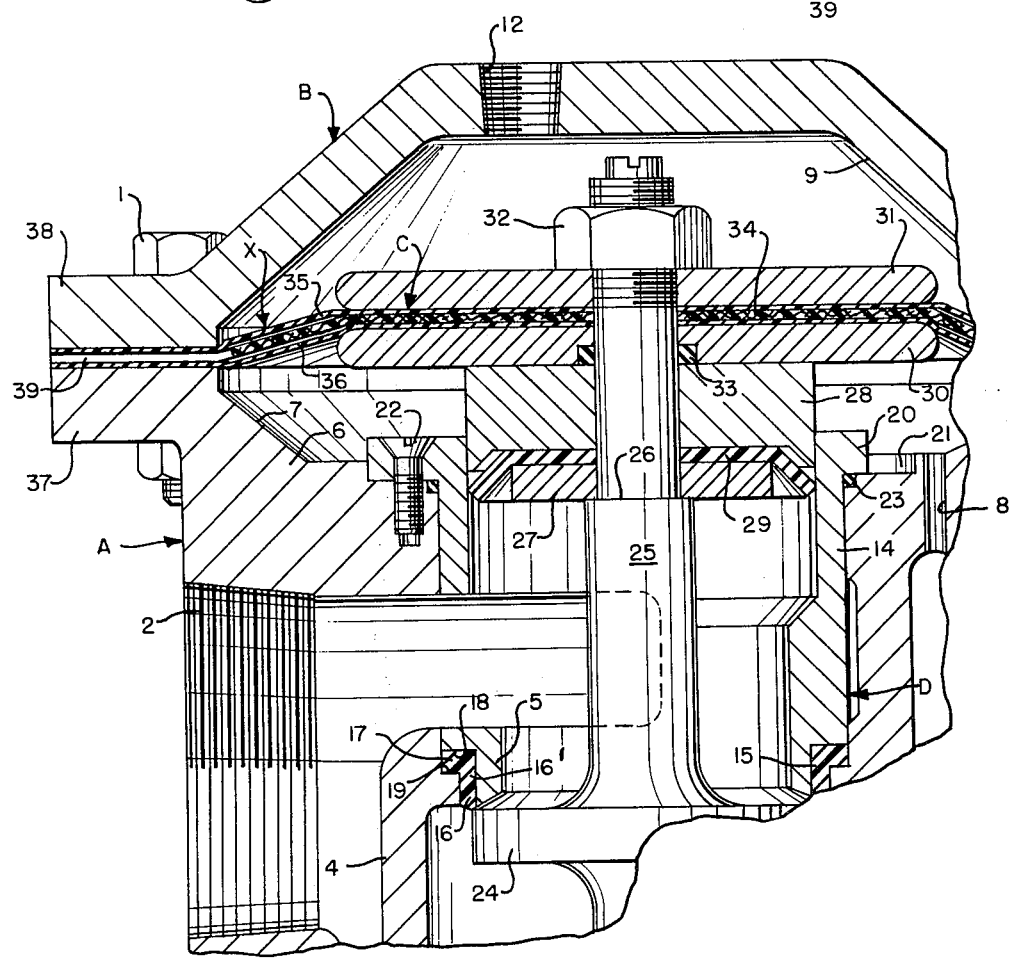

HIGH TEMPERATURE FLUID PRESSURE CONTROL VALVE

This is a continuation, of application Ser. No. 817,455, filed Apr. 18, 1969.

This invention relates to fluid pressure control valves of the type including a valve casing that has an inlet and an outlet between which is a valve port and a valve seat with which cooperates a valve head whose stem or spindle is connected to an elastomeric diaphragm opposite sides of which are responsive respectively to the downstream or outlet pressure of a fluid such as steam, and to a regulating pressure such as air or a spring.

It has been proposed to utilize a diaphragm comprising a main layer of rubber between layers of leather so that the life of the rubber is prolonged by the action of the retaining layers of leather, as suggested, for example, by U.S. Pat. No. 2,000,542. It has also been proposed to prevent contamination of a fluid sample in a fluid pressure equalizer by the chemicals in a neoprene diaphragm, by placing a layer of "Teflon" on each side of the neoprene sheet, as disclosed by U.S. Pat. No. 2,736,332.

Generally in the prior art the valve stem guide forms an integral part of the valve casing so that in order to replace a worn valve guide, the whole casing section must be replaced.

In most valve constructions, the valves must be assembled and disassembled piece by piece which requires an excessive amount of time and care.

It is customary to screw in valve seats or otherwise attach the seats to the valve port or bushing in such a manner that the construction is costly and considerable time and effort is required to replace a valve seat.

The prior art diaphragms including those mentioned above are not suitable for use with high temperature pure steam, particularly steam at temperatures in excess of 350°F. And in many constructions, such as the multi-layer diaphragms described in U.S. Pat. No. 2,000,542, the steam in time leaks through the outer layers so as to cause rapid deterioration of the inner main layer which is generally formed of rubber or the like.

One object of the invention is to provide a fluid pressure apparatus, particularly a control valve, which overcomes the above-mentioned deficiencies of the prior art apparatus.

The invention especially contemplates a multi-layer diaphragm which shall be compatible with pure steam at temperatures as high as 550°F. The invention provides a main layer of known material, for example Nylon fabric coated with viton, rubber or the like, which is suitable for temperatures of 550°F. in air but which cannot withstand temperatures in pure steam much above 300°F. To at least one side of said main layer is applied a protective layer of material, such as "Teflon," which is compatible with pure steam at temperatures as high as +550°F. The layers are arranged and mounted in the valve casing so that a second fluid, for example air, is present between said layers to contaminate any steam that may enter, for example by leakage, between said layers, whereby to protect the main layer from contact with pure steam.

Another object of the invention is to provide a one-piece upper valve guide and valve seat bushing which can be easily and quickly removed from and replaced in a valve casing.

It is another object to provide a novel and improved construction and assembly of the valve head and stem, a unitary valve stem guide and valve guide bushing, a snap-on valve seat on the bushing which, as an assembly, is insertable into and removable from the casing at the same time, providing for simple and quick change of the valve trim.

The invention also provides a positive seal between the supply or inlet pressure and the sensing side of the diaphragm assembly to effectively prevent the upstream or inlet pressure from leaking into the downstream or outlet pressure, to insure that even under "dead-end service" the valve will maintain a constant downstream pressure.

For a more complete understanding of the invention, reference should be had to the accompaying drawings, in which —

FIG. 1 is a side elevation, with portions broken away and shown in section, of a fluid pressure control valve embodying the invention and wherein the regulating pressure is compressed air;

FIG. 2 is an enlarged horizontal sectional view approximately on the plane of the line 2—2 of FIG. 1;

FIG. 3 is a greatly enlarged fragmentary vertical sectional view through the valve with portions omitted;

Figure 4:
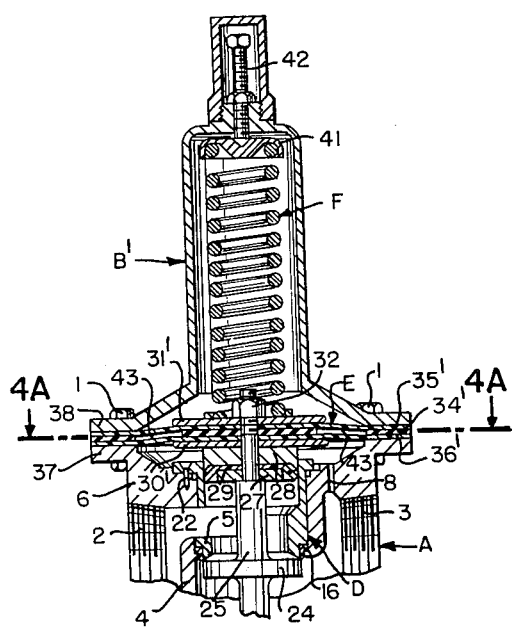
FIG. 4 is a fragmentary vertical sectional view through a fluid pressure control valve embodying a modification of the invention and wherein the regulating pressure is spring pressure.

Specifically describing the embodiment of the invention shown in FIGS. 1, 2 and 3, the valve casing is shown as comprising a body A and a cover B on the body by bolts 1 and having clamped between them a diaphragm C. The valve body has an inlet opening 2 and an outlet opening 3 separated by a partition 4 in which is a valve port 5. The valve body also has a top wall 6 formed with a recess 7 which communicates with the outlet through a duct B. The cover is dome shaped to provide a recess 9 at the side of the diaphragm opposite the recess 7 so that the diaphragm is responsive to the outlet pressure in the recess 7 and to a regulating pressure in the recess 9, which regulating pressure in the present instance is compressed air supplied under control through a valve 10 and a pipe 11 to the recess 9. In FIG. 3 the cover is shown with a threaded opening 12 into which the pipe 11 is screwed.

The top wall 6 of the valve body has an opening in axial alignment with the valve port 5. A valve guide D has a cylindrical portion 14 at its upper end slidably fitted in the opening and has a valve seat bushing 15 at its lower end on which is removably fitted a valve seat 16. The valve seat is preferably formed of semi-soft and elastic material such as "Teflon" impregnated with glass, or fiber-glass impregnated with "Teflon" or the like. The seat comprises a cylindrical portion 16' having an outer diameter to slidably fit the valve port 5, and having an inner diameter to frictionally or elastically snap to the bushing 15. At one end of the cylindrical portion 16' has an outwardly projecting flange 17 that seats on a shoulder 18 on the bushing and is adapted to be clamped between said shoulder and an interior shoulder 19 in the valve port.

The upper end of the cylindrical portion 14 of the valve guide D has an out-turned flange 20 that seats in a depression 21 in the upper surface of the top wall 6, and the valve guide is held in operative position as shown in FIGS. 1 and 3 by screws 22 that pass through openings in the flange 20 and are screwed into the top wall 6. Suitable packing is interposed between the valve guide and the wall 6, and, as shown in FIG. 3, an O-ring 23 is seated in a rabbet in the wall under the flange 20.

Coacting with the valve seat to control the valve port is a valve head 24 that is carried by a valve stem 25 which has an intermediate shoulder 26 that is abutted by a circular plate 27. Between circular plate 27 and a guide block 28 is clamped a packing disk 29 having an inclined flange which has wiping contact with the interior surface of the cylindrical portion 14 of the valve guide D. The block 28 also has a sliding engagement with said inner surface of the valve guide and is mounted on the valve stem in encircling relation thereto.

The top of the guide block 28 has set thereon a diaphragm plate 30 between which and a similar plate 31 is clamped the central portion of the diaphragm C. A nut 32 on the threaded upper end of the valve stem which projects centrally through said plates, firmly clamps the plates, diaphragm, the guide block, the packing disk 29 and the plate 27 between itself and the shoulder 26 on the valve stem. Desirably an O-ring 33 encircles the valve stem between the plate 30 and the guide block 28.

The diaphragm in this form of the invention is shown as comprising a circular main layer 34 formed of material, for example, nylon fabric coated with viton or rubber or similar material which is incompatible with pure steam at temperatures substantially above 300°F. At each side of the main layer is a protective layer of material, for example "Teflon," which is compatible with pure steam at temperatures as high as 550°F. However, the protective layer of material may be permeable to high temperature steam, as is the case with Teflon. These layers are deonted 35 and 36, and the central portions of all of the layers are firmly clamped between the diaphragm plates 30 and 31 while their perimetral portions are clamped between the flanges 37 and 38 of the valve body and valve cover respectively. The portions of the outer layers 35 and 36 between the flanges 37, 38 and the edges of the diaphragm plates are in spaced relation to the main layer 34 as indicated at X in FIG. 3. Also, the main layer 34 has a plurality of radial notches 39 leading inwardly from the edge of the layer to the spaces between the outer layers and the main layer indicated at X.

The lower end of the valve stem is guided by a lower valve guide 40 in the valve body as shown in FIG. 1.

In operation, assuming that high temperature steam enters the inlet 2 and the valve head 24 is not seated, the steam will flow through the duct 8 into contact with the lower side of the diaphragm C. Assuming that the regulating pressure for the downstream flow of steam from the outlet 3 constitutes air pressure, that air will contact with the upper side of the diaphragm. When the pressure beneath the diaphragm is less than the pressure above the diaphragm, the valve head will be moved away from the valve seat to open the valve port as shown in FIG. 1, while when the pressure beneath the diaphragm exceeds the pressure above the diaphragm, the valve head moves toward the valve seat to close the valve port. The packing disk 29 and the O-ring 23 effectively prevent the upstream or inlet pressure from leaking into the downstream or outlet pressure, and this is particulary important under "dead-end service" of the valve to maintain a constant downstream pressure.

With this construction, it will be seen that a second fluid, for example ambient air, may enter through the slots 39 into the spaces between the layers of the diaphragm in the zones where the steam contacts the diaphragm. This second fluid will contaminate any high temperature pure steam that might leak into the spaces between the main layer and the protective layer thereby protecting the main layer from damage by high temperature pure steam, In case of wear of the valve guide, guide block, packing disk 29 or valve seat, the valve can be easily and quickly disassembled by simply removing the cover B, the nut 32, the diaphragm plates and the diaphragm, removing the screws 22 and then pulling the valve guide, valve seat, valve stem and guide block as an assembly and at the same time out of the valve body. A worn valve guide can then be easily replaced. If desired, a worn valve seat can be easily slipped off the bushing 15 and a new one can be elastically snapped on or frictionally slid over the bushing 15.

In the construction shown in FIGS. 1 to 3 inclusive, the spaces between the layers of the diaphragm at the zone denoted X are ventilated, that is they are constantly opened to the atmosphere through the slots 39. The lower Teflon layer 36 and the air in the space between that layer and the main layer 34 protects that zone of the main layer from damage that would otherwise be caused by direct contact of the high temperature steam with the main layer material.

Figure 4A:
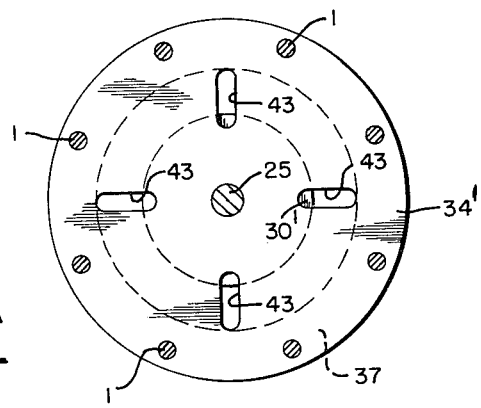
FIG. 4A is a horizontal sectional view on a reduced scale taken approximately on the plane of the line 4A of FIG. 4.

In FIG. 4 another type of valve and a modification of the diaphragm are shown. The valve casing body, the valve guide and valve stem are the same as those shown in FIGS. 1 through 3 but the diaphragm E is different from the diaphragm C and the cover B' is of a shape to accommodate a compression spring F which is interposed between the upper diaphragm plate 31' and a plate 41 which is adjustable by a screw 42 threaded in the cover in known manner. The spring applies the regulating pressure to the diaphragm in known manner. In this form of the invention air is trapped between the main layer 34' and the Teflon layers 35' and 36'. As shown, the main layer 34' has a plurality of slots 43, as best shown in FIG. 4A, preferably located in the zones of the main layer that would otherwise be directly contacted by the pure steam, to serve as storage pockets for the entrapped air. In operation of the valve, the entrapped air circulates in the spaces between the main layer and the Teflon layers to contaminate any pure steam that may leak into said spaces, thereby protecting the main layer from damage by pure steam.

Figure 5:
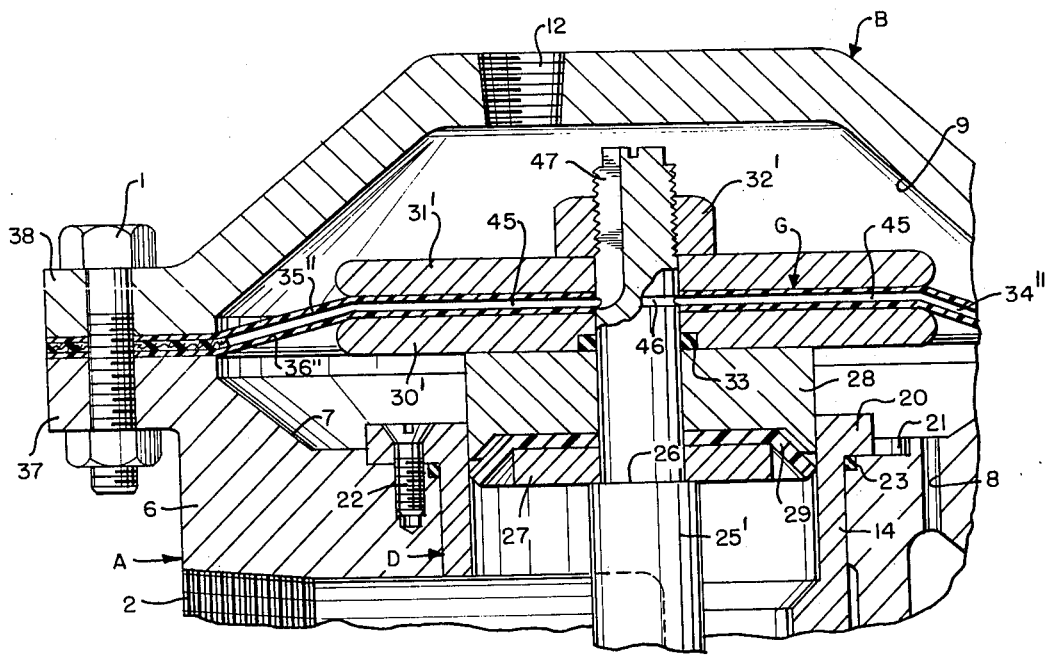
FIG. 5 is a view similar to FIG. 3 showing another modification of the invention.

Another modification of the invention is shown in FIG. 5 where the construction is in general the same as that shown in FIGS. 1 through 3 with the exception of the diaphragm which embodies a modification of the invention. Here the diaphragm G has a main layer 34" and protective layers of Teflon or the like 35" and 36". The layers are clamped between the diaphragm plates 30' and 31', and a nut 32' on the valve stem 25' clamps the plates and the diaphragm between itself and the valve guide block 28. The main layer has a plurality of radial slots 45 which lead from the valve stem outwardly to points in spaced relation to the edges of the diaphragm, the outer ends of the slots being preferably located at the inner ends of the zones in which the diaphragm is clamped between the casing flanges 37 and 38. The valve stem has a circumferential groove 46 and a longitudinal groove 47 which leads from the outer end of the stem inwardly to said circumferential groove. With this construction, the air or other second fluid above the diaphragm is admitted through the slots 45 into the spaces between the main layer and the two protective layers so as to contaminate any pure steam that may leak into said space.

Figure 6:
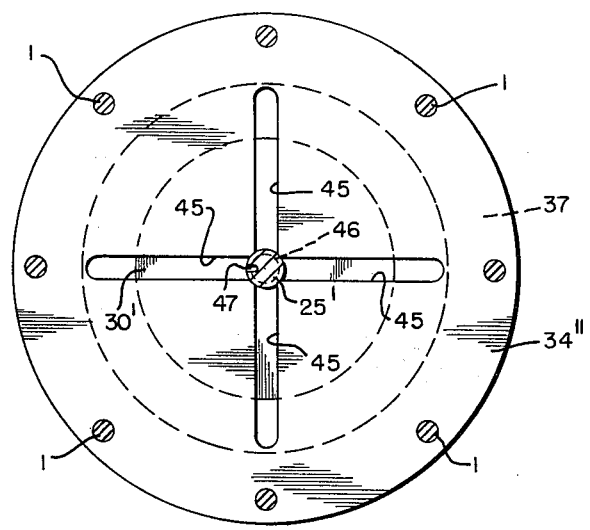
FIG. 6 is a horizontal sectional view of FIG. 5 on a reduced scale similar to FIG. 2.
Figure 7:
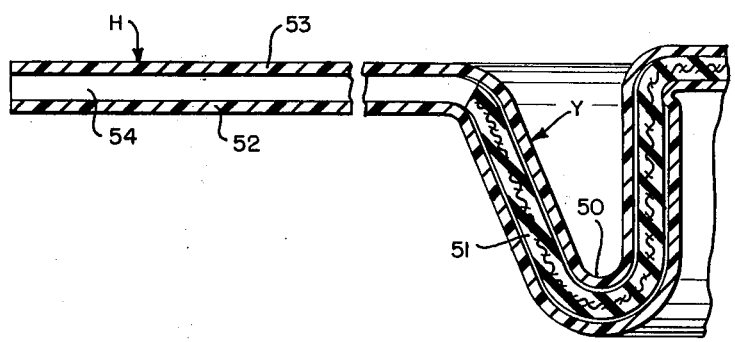
FIG. 7 is an enlarged fragmentary transverse sectional view of another form of diaphragm embodying the invention.

It will be understood that the invention may be embodied in diaphragms of other shapes than those shown in FIGS. 1 through 5 inclusive. For example, FIG. 7 shows a generally known type of diaphragm H which has a concentric groove or corrugation formed therein. As shown the main layer has a concentric corrugation 50 between its perimeter and its center. The protective layers 52 and 53 of Teflon or the like are similarly shaped but are spaced from the main layer in the zone generally designated Y in which the main layer would without the protective layers be contacted by the pure steam. Air may be either admitted to those spaces through radial slots 54 which serve the same purpose as the slots 39 in FIG. 2, or the air may be entrapped in said spaces as shown in FIGS. 4 and 4A or the air may be admitted into said spaces from the regulating pressure chamber in a manner similar to that shown in FIGS. 5 and 6.

Figure 8:
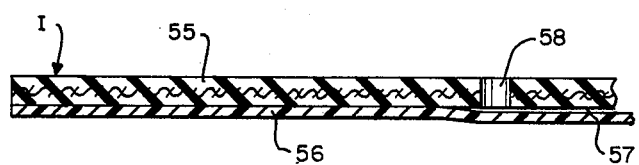
FIG. 8 is a similar view of another form of diaphragm embodying the invention.

It is understood that in many cases it is desirable to utilize only one protective layer for the main layer, for example to protect the main layer only on that side which would otherwise be contacted by the steam. FIG. 8 shows such a diaphragm I wherein the main layer 55 has at one side thereof a protective layer 56. A second fluid, such as air, is admitted into the space 57 between the two layers and is then admitted through one or more openings 58 into the main layer.

While the now preferred embodiments of the invention have been shown and described, it will be understood by those skilled in the art that the diaphragm embodying the invention may be utilized in other types of apparatus and that many modifications and changes can be made in the construction of the valves within the spirit of the invention and the scope of the appended claims.

What is claimed is:

1. A high temperature fluid pressure operated control apparatus for handling fluids in excess of 350°F. in temperature of the type having a casing with an inlet and an outlet for the flow of a first fluid under pressure and having a temperature in excess of 350°F., a diaphragm mounted in said casing, said diaphragm having a first side and a second side, means placing a portion of said first diaphragm side in communication with said first fluid in said inlet or outlet, means applying a regulating pressure on said second diaphragm side, and means actuated by said diaphragm in response to variations in differences of pressure on said first and second diaphragm sides for regulating said inlet or outlet fluid pressure, said regulating means including a valve stem, said diaphragm being flexible and having a main layer comprising an elastomeric material, and a protective layer permeable to and compatible with said first fluid at high temperature in excess of 350°F. in pure form, said main layer being incompatible with said first fluid at high temperatures in excess of 350°F. in pure form, said protective layer being at least coextensive with said first diaphragm side, said protective layer being separable from said main layer at said portion of said first diaphragm side in communication with said first fluid, a centrally located opening being formed in said diaphragm through said main layer and said protective layer, said valve stem extending through said diaphragm opening, means on said valve stem for securing said diaphragm to said valve stem, said casing further comprising first and second flanged members, the peripheral edge of said diaphragm being clamped between said first and second members, and means for introducing a second fluid between said protective layer and said main layer in order to mix with and contaminate said first fluid at high temperatures in excess of 350°F. and in pure form which permeates through said protective layer, whereby to protect said main layer, said first fluid being steam, and said protective layer being Teflon.

2. The fluid pressure operated control apparatus defined in claim 1, said introducing means comprising a slot in said main layer, said main layer slot extending inwardly from said peripheral diaphragm edge, said peripheral diaphragm edge being exposed to said second fluid.

3. The fluid pressure operated control apparatus defined in claim 1, said introducing means comprising a slot in said main layer, said main layer slot extending outwardly from said valve stem, said valve stem having a passage for conducting said second fluid into said slot.

4. The fluid pressure operated control apparatus defined in claim 1, said casing having a partition between said inlet and outlet, said partition forming a valve port, a valve head mounted on said valve stem to control said valve port, a valve guide separably and slidably mounted in said casing, said valve guide having a bushing at one end disposed in said valve port and a valve seat frictionally encircling said bushing and slidable therewith into and out from said valve port, a valve guide block secured on said valve stem and slidable in said valve guide, and a packing disk mounted on said valve stem between said guide block and said valve port, said disk having sliding contact with said valve guide which is fluid-tight against said inlet fluid pressure.

5. The fluid pressure operated control apparatus defined in claim 1, said main layer comprising nylon fabric coated with viton.

6. A high temperature fluid pressure operated control apparatus for handling fluids in excess of 350°F. in temperature of the type having a casing with an inlet and an outlet for the flow of a first fluid under pressure and having a temperature in excess of 350°F., a diaphragm mounted in said casing, said diaphragm having a first side and a second side, means placing a portion of said first diaphragm side in communication with said first fluid in said inlet or outlet, means applying a regulating pressure on said second diaphragm side, and means actuated by said diaphragm in response to variations in differences of pressure on said first and second diaphragm sides for regulating said inlet or outlet fluid pressure, said regulating means including a valve stem, said diaphragm being flexible and having a main layer comprising an elastomeric material, and a protective layer permeable to and compatible with said first fluid at high temperatures in excess of 350°F. in pure form, said main layer being incompatible with said first fluid at high temperatures in excess of 350°F. in pure form, said protective layer being at least coextensive with said first diaphragm side, said protective layer being separable from said main layer at said portion of said first diaphragm side in communication with said first fluid, a centrally located opening being formed in said diaphragm through said main layer and said protective layer, said valve stem extending through said diaphragm opening, means on said valve stem for securing said diaphragm to said valve stem, said casing further comprising first and second flanged members, the peripheral edge of said diaphragm being clamped between said first and second members, and means for entrapping a second fluid between said protective layer and said main layer in order to mix with and contaminate said first fluid at high temperatures in excess of 350°F. and in pure form which permeates through said protective layer, whereby to protect said main layer, said first fluid being steam, and said protective layer being Teflon.

7. A diaphragm for high temperature fluid pressure apparatus designed to handle fluid in excess of 350°F. in temperature, comprising a main layer of elastomeric material, and a protective layer permeable to and compatible with a first fluid in pure form having a temperature in excess of 350°F. covering said main layer, said main layer being incompatible with said first fluid having a temperature in excess of 350°F. in pure form, a portion of said protective layer being separable from said main layer to provide space for a second fluid to mix with and contaminate said first fluid at high temperatures in excess of 350°F. and in pure form which permeates through said protective layer, whereby to protect said main layer, said first fluid being steam, and said protective layer being Teflon.

8. A diaphragm as defined in claim 7, said main layer having an opening for permitting a second fluid to enter between said main and protective layers.

9. A high temperature fluid pressure operated control apparatus for handling fluids in excess of 350°F. in temperature of the type having a casing with an inlet and an outlet for the flow of a first fluid under pressure and having a temperature in excess of 350°F., a diaphragm mounted in said casing, said diaphragm having a first side and a second side, means placing a portion of said first diaphragm side in communication with said first fluid in said inlet or outlet, means applying a regulating pressure on said second diaphragm side, and means actuated by said diaphragm in response to variations in differences of pressure on said first and second diaphragm sides for regulating said inlet or outlet fluid pressure, said diaphragm being flexible and having a main layer comprising an elastomeric material, and a protective layer permeable to and compatible with said first fluid at high temperatures in excess of 350°F. and in pure form, said main layer being incompatible with said first fluid at high temperatures in excess of 350°F. in pure form, said protective layer being at least coextensive with said first diaphragm side, said protective layer being separable from said main layer at said portion of said first diaphragm side in communication with said first fluid, and means for permitting a second fluid to enter between said protective layer and said main layer in order to mix with and contaminate said first fluid at high temperatures in excess of 350°F. and in pure form which permeates through said protective layer, whereby to protect said main layer, said first fluid being steam and said protective layer comprising Teflon, and the permeability of said protective layer being the sole means in said apparatus by which said first fluid may enter between said protective layer and said main layer.

10. The improved fluid pressure operated control apparatus defined in claim 9 wherein said casing further comprises first and second flanged members, the peripheral edge of said diaphragm is clamped between said first and second members and said means permitting a second fluid to enter between said protective and main layers comprises a slot in said main layer.

11. The improved fluid pressure operated control apparatus defined in claim 10 wherein said main layer slot extends inwardly from said peripheral diaphragm edge.

12. The improved fluid pressure operated control apparatus defined in claim 10 wherein said means actuated by said diaphragm includes a valve stem passing centrally through said diaphragm, said main layer slot extends outwardly from said valve stem and said stem has a passage for conducting a second fluid into said slot.

13. The improved fluid pressure operated control apparatus defined in claim 9 wherein said casing has a partition between said inlet and outlet, said partition forming a valve port, said means actuated by said diaphragm include a valve stem passing through and fastened to said diaphragm, a valve head mounted on said valve stem to control said valve port, a valve guide separably and slidably mounted in said casing, said valve guide having a bushing at one end disposed in said valve port and a valve seat frictionally encircling said bushing and slidable therewith into and out from said valve port, a valve guide block secured on said valve stem and slidable in said valve guide, and a packing disk mounted on said valve stem between said guide block and said valve port, said disk having sliding contact with said valve guide which is fluid-tight against said inlet fluid pressure.

14. The improved fluid pressure operated control apparatus defined in claim 9, wherein said main layer comprises nylon fabric coated with viton.

15. A high temperature fluid pressure operated control apparatus for handling fluids in excess of 350°F. in temperature of the type having a casing with an inlet and an outlet for the flow of a first fluid under pressure and having a temperature in excess of 350°F., a diaphragm mounted in said casing, said diaphragm having a first side and a second side, means placing a portion of said first diaphragm side in communication with said first fluid in said inlet or outlet, means applying a regulating pressure on said second diaphragm side, and means actuated by said diaphragm in response to variations in differences of pressure on said first and second diaphragm sides for regulating said inlet or outlet fluid pressure, said diaphragm being flexible and having a main layer comprising an elastomeric material, and a protective layer permeable to and compatible with said first fluid at high temperatures in excess of 350°F. and in pure form, said main layer being incompatible with said first fluid at high temperatures in excess of 350°F. in pure form, said protective layer being at least coextensive with said first diaphragm side, said protective layer being separable from said main layer at said portion of said first diaphragm side in communication with said first fluid, and means for entrapping a second fluid between said protective layer and said main layer in order to mix with and contaminate said first fluid at high temperatures in excess of 350°F. and in pure form which permeates through said protective layer, whereby to protect said main layer, said first fluid being steam and said protective layer comprising Teflon, and the permeability of said protective layer being the sole means in said apparatus by which said first fluid may enter between said protective layer and said main layer.

* * * * *